United States Patent
Jarrier et al.

(10) Patent No.: US 9,120,046 B2
(45) Date of Patent: Sep. 1, 2015

(54) FILTER MEDIA AND FILTER DEVICE COMPRISED THEREOF

(75) Inventors: Etienne Rene Jarrier, Basingstoke (GB); Martin Gregory Hatfield, Odessa, MO (US); Paul Sherwood Bryant, Amesbury (GB)

(73) Assignee: BHA Altair, LLC, Franklin, TN (US)

( * ) Notice: Subject to any disclaimer, the term of this patent is extended or adjusted under 35 U.S.C. 154(b) by 94 days.

(21) Appl. No.: 13/564,304

(22) Filed: Aug. 1, 2012

(65) Prior Publication Data

US 2014/0033663 A1 Feb. 6, 2014

(51) Int. Cl.
*B01D 46/00* (2006.01)
*B01D 46/52* (2006.01)
*F02C 7/052* (2006.01)

(52) U.S. Cl.
CPC ............. *B01D 46/521* (2013.01); *F02C 7/052* (2013.01); *B01D 2275/10* (2013.01); *B01D 2275/105* (2013.01)

(58) Field of Classification Search
CPC ............. B01D 46/521; B01D 2275/10; B01D 2275/105
USPC ............ 55/486, 501–502, 521; 210/470, 488, 210/493.1; 96/4, 9; 95/67, 69, 78
See application file for complete search history.

(56) References Cited

U.S. PATENT DOCUMENTS

| | | | |
|---|---|---|---|
| 3,487,943 A | 1/1970 | Buckman | |
| 6,409,785 B1 | 6/2002 | Smithies et al. | |
| 7,316,723 B2 | 1/2008 | Chung et al. | |
| 7,927,540 B2 | 4/2011 | Smithies et al. | |
| 7,942,948 B2 | 5/2011 | Smithies et al. | |
| 8,029,588 B2 | 10/2011 | Chung et al. | |
| 2004/0141835 A1 | 7/2004 | Katayama et al. | |
| 2006/0016753 A1* | 1/2006 | Sowemimo-Coker et al. | 210/651 |
| 2007/0084786 A1 | 4/2007 | Smithies | |
| 2008/0217241 A1 | 9/2008 | Smithies et al. | |
| 2008/0314010 A1 | 12/2008 | Smithies et al. | |
| 2009/0266048 A1 | 10/2009 | Schwarz | |
| 2010/0032365 A1* | 2/2010 | Moe et al. | 210/470 |
| 2011/0016838 A1 | 1/2011 | Smithies et al. | |
| 2011/0132198 A1 | 6/2011 | Gallo | |

FOREIGN PATENT DOCUMENTS

| | | |
|---|---|---|
| EP | 2100652 A1 | 9/2009 |
| FR | 1233037 A | 10/1960 |
| WO | WO-2006066835 | 6/2006 |

OTHER PUBLICATIONS

EP Search Report issued in connection with corresponding EP Patent Application No. 13177900.1 dated on Nov. 7, 2013.

* cited by examiner

*Primary Examiner* — Jason M Greene
*Assistant Examiner* — Karla Hawkins
(74) *Attorney, Agent, or Firm* — Reinhart Boerner Van Deuren P.C.

(57) ABSTRACT

This disclosure describes examples of a filter media for use in filter devices, e.g., pulse filter cartridges found in power generating systems. Embodiments of the filter media include a base media and a membrane, which partially covers one or both sides of the base media. In one embodiment, the membrane covers a membrane area of at least one side of the base media, wherein the membrane area is less than a total area of the side on which the membrane is disposed.

13 Claims, 4 Drawing Sheets

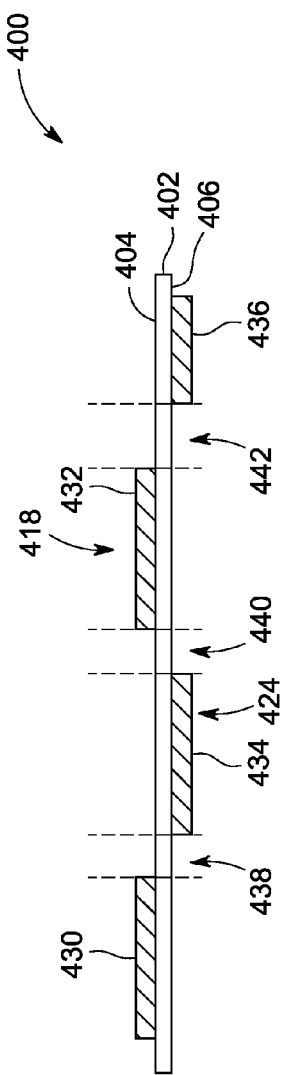
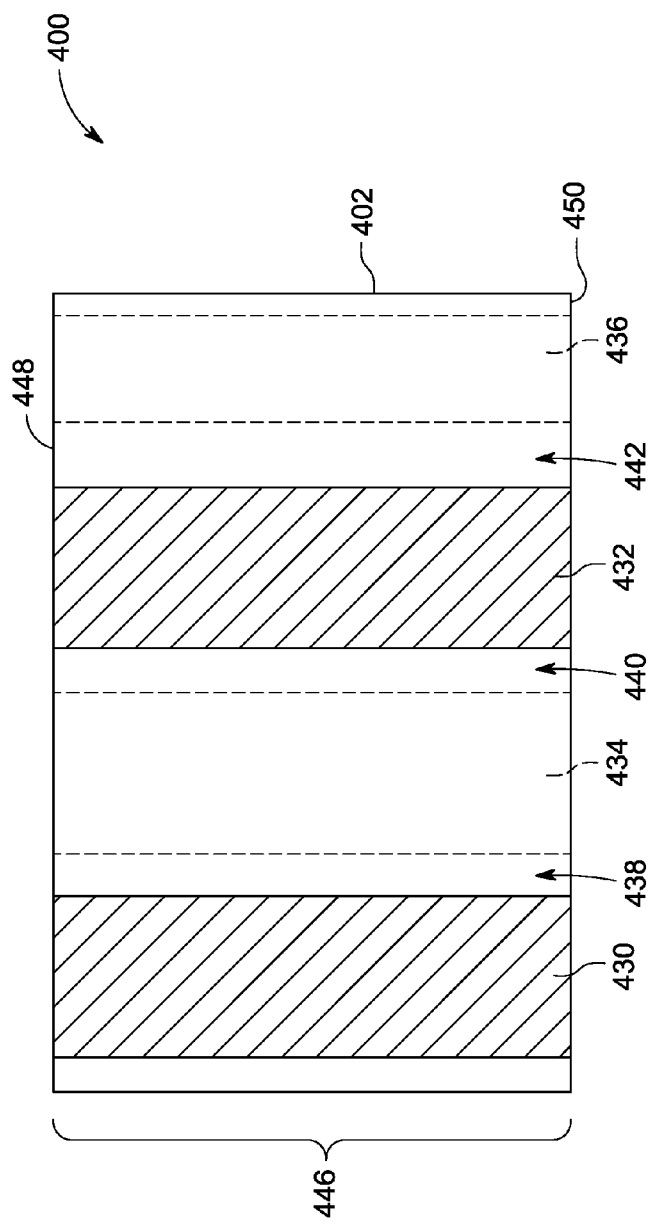

FILTER MEDIA AND FILTER DEVICE COMPRISED THEREOF

BACKGROUND OF THE INVENTION

The subject matter disclosed herein relates to filters and filter media and, in particular, to embodiments of a partially-laminated filter media and, for example, filter devices comprised thereof that find use in fluid conditioning systems.

Power generating systems, heating, ventilation, and cooling (HVAC) systems, and other systems often deploy filters and moisture separators to remove moisture and debris from a working fluid. For example, power generating systems may use turbo-machines to drive a generator. During normal operation, the turbo-machines draw in air for combustion. The air passes through a compressor before a combustor mixes the air with fuel and ignites the mixture to drive a turbine.

Contaminants (e.g., dirt, dust, and salt) in the air can reduce performance and efficiency of the turbo-machine. These contaminants can corrode the surface of the compressor blades. The resulting surface roughness decreases air flow and efficiency and, ultimately, reduces both the output of the turbo-machine and the efficiency of the power generating system overall. To prevent damage, the power generating systems can incorporate a filtration system that removes particulates from the air upstream of the turbo-machine. Examples of these filtration systems may feature a filter device. The filter device has a filter media to capture particulates before the particulates can reach the combustor.

During long periods of operation, particulates may saturate the filter media. The resulting particulate build-up may impede the flow of air and increase pressure drop across the filter media. Accordingly, systems like power generating systems often deploy filter cleaning procedures to periodically remove some or all of the particulates. These cleaning procedures extend the useful life of the filter device before a technician must remove and replace the old, contaminated filter device with a new, non-contaminated one during maintenance. In one example, the cleaning procedure injects pressurized air (or other fluid) into one end of the filter device to dislodge the particulates from the outer side of the filter media.

Examples of the filter media may include a base media and material layers (e.g., nanofiber layers), which can cover one of the upstream and the downstream sides of the base media. The material layers help to increase the dust removal efficiency of the filter. The base media helps to support the material layers. However, although the material layers improve dust removal efficiency, use of the material layers can increase filter pressure loss of the filter media under certain conditions, e.g., fog and/or high-humidity conditions.

The discussion above is merely provided for general background information and is not intended to be used as an aid in determining the scope of the claimed subject matter.

BRIEF DESCRIPTION OF THE INVENTION

This disclosure describes examples of a filter media for use in filter devices and related devices for fluid conditioning systems, e.g., pulse filter cartridges found in power generating systems. Embodiments of the filter media include a base media and a membrane, which partially covers one or both sides of the base media. In one embodiment, the membrane covers a membrane area of at least one side of the base media, wherein the membrane area is less than a total area of the side on which the membrane is disposed. An advantage that embodiments of the proposed filter media, and filter device, is to maintain filter efficiency in fog conditions as well as to avoid spikes in pressure loss and to permit cleaning using pulse cleaning techniques.

This disclosure describes, in one embodiment, a filter device comprises a base media and a first membrane covering a first membrane area on a first side of the base media. The first membrane area is less than a total area of the first side on which the first membrane is disposed.

This disclosure also describes, in one embodiment, a filter device that comprises a base media and a first membrane covering a first membrane area on a first side of the base media. The first membrane area is less than a total area of the first side on which the first membrane is disposed. The filter device also comprises a second membrane covering a second membrane area on a second side of the base media. The second membrane area is less than a total area of the second side on which the second membrane is disposed.

This disclosure further describes, in one embodiment, a power generating system that comprises a turbo-machine and an air filter unit upstream of the turbo-machine. The air filter unit comprises a tubesheet and a filter device secured to the tubesheet. The filter device comprises a filter media with a base media and a first membrane covering a first membrane area of a first side of the base media, wherein the first membrane area is less than a total area of the first side on which the membrane is disposed.

This brief description of the invention is intended only to provide a brief overview of the subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIG. 5 depicts a side view of an exemplary embodiment of a filter media with a membrane covering a first side and a second side of a base media;

FIG. 6 depicts a top view of the filter media of FIG. 5; and

DETAILED DESCRIPTION OF THE INVENTION

Broadly, the discussion below sets forth various embodiments of a filter media that includes a base media that is partially-laminated with a membrane. These embodiments provide adequate filter efficiency, e.g., for use in fluid conditioning system that filter air in power generating systems, while passing certain threshold performance requirements. For example, the filter media passes certain pulse-jet cleaning criteria including rejection testing procedures. The filter media also maintains performance under varying environmental conditions including fog conditions and similar conditions in which high moisture content prevail.

Figure 1:
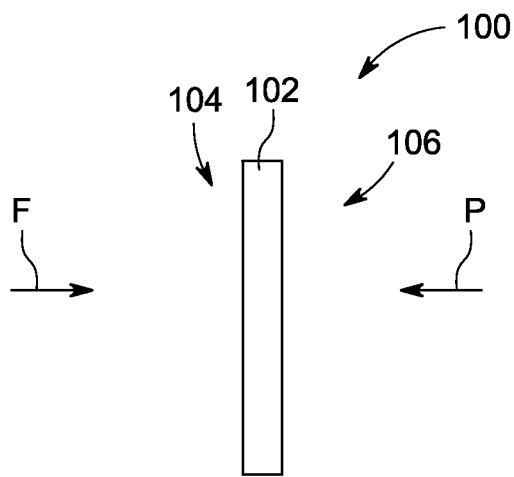
FIG. 1 depicts a side view of an exemplary embodiment of a filter media.

FIG. 1 depicts a side, schematic view of an exemplary embodiment of a filter media 100 that finds use in filter devices, e.g., pulse cartridge filters found in power generating systems. The filter media 100 includes a base media 102 with an upstream side 104 (also "a first side 104") and a downstream side 106 (also "a second side 106"). The filter media 100 is shown in the form of a flat sheet. Manufacturing processes can manipulate the flat sheet to form pleats and folds that fit many different form factors and filter devices.

Figure 2:
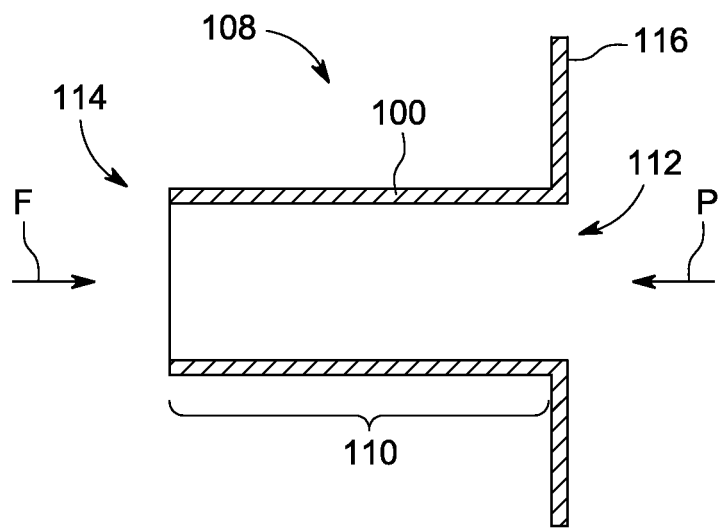
FIG. 2 depicts a side view of an example of a filter device.
Figure 7:
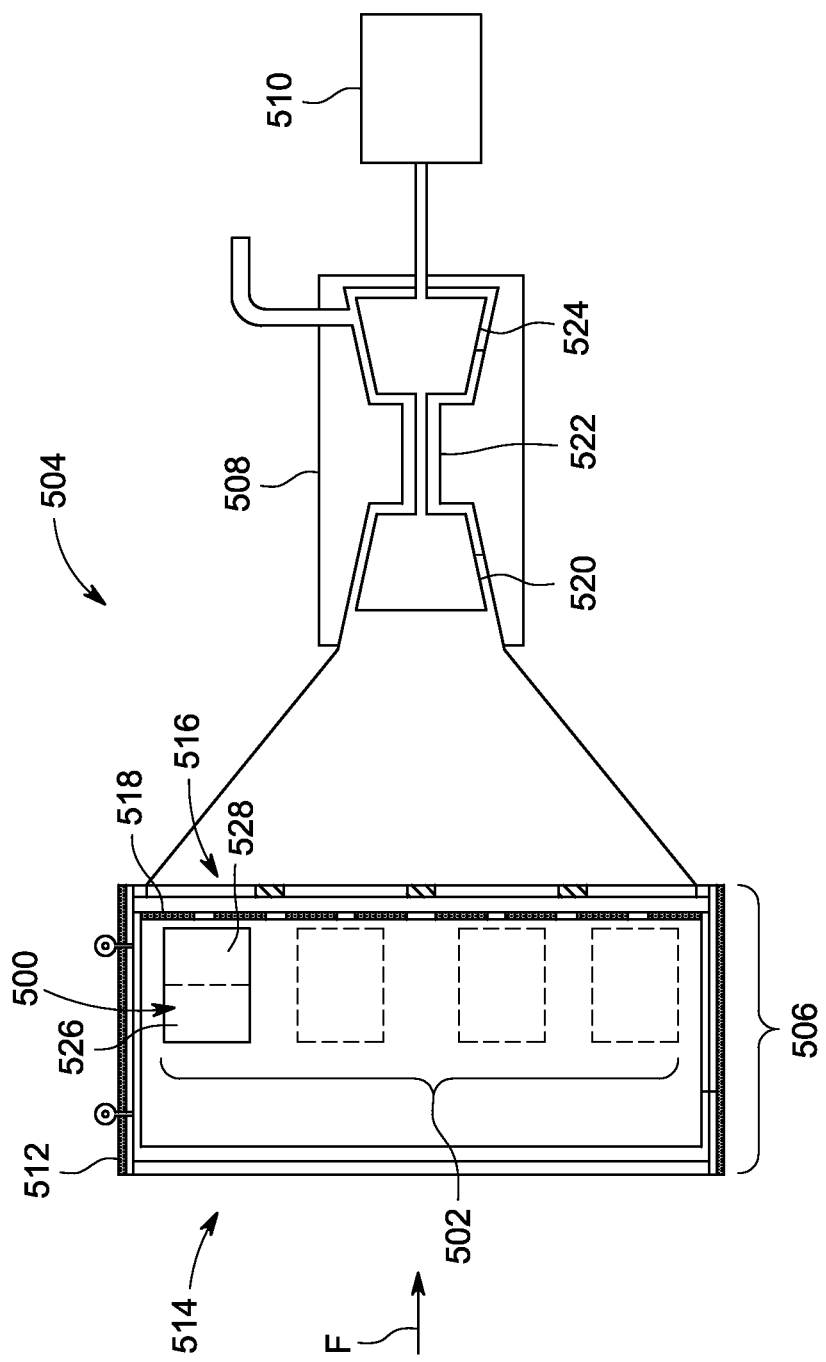
FIG. 7 depicts a schematic diagram of an exemplary system, e.g., a power generating system.

FIG. 2 illustrates one exemplary implementation of the filter media 100 in a filter device 108. Examples of the filter device 108 include pulse cartridge filters, which filter incoming air upstream of a turbo-machine or other power generating device. In FIG. 2, the filter device 108 has an elongated body 110 with a first end 112 and a second end 114. The filter device 108 secures at its first end 112 to a wall 116 (also "tubesheet 116"). On the second end 114, the filter device 108 is closed and/or sealed, which causes incoming airstream F to flow through the filter media 100. The tubesheet 116 can form part of a filter unit and/or assembly (e.g., as shown in FIG. 7 and described further below). In this mounted configuration, incoming airstream F flows from the second end 114 of the filter device 108 towards the first end 112, passing through the filter media 100 (from the upstream side 104 to the downstream side 106) and transiting through the tubesheet 116 to the turbo-machine.

The base media 102 captures material (e.g., particulates and debris) found in the incoming airstream F as the airstream F transits through the filter media 100. As discussed more below, the filter media 100 can also include one or more membranes that reside on one or more of the upstream side 104 and the downstream side 106 of the base media 102. The membranes improve the dust removal performance of the base media 102 and can generate an increase in pressure loss during fog and high moisture conditions in which the incoming airstream F includes a high concentration of water droplets that impinge on the filter device 108. For example, examples of the base media 102 that are partially-laminated with membrane minimize the likelihood of a spike in pressure loss versus conventional filter media that are completely laminated.

Use of these membranes also make in-situ cleaning of the base media 102 more effective. For example, the membranes can improve the cleaning efficacy of pulse jet cleaning, which directs a pulse jet P at the downstream side 106 of the base media 102. Examples of the pulse jet P help to remove particulates from the upstream side 104 to extend the life and restore filter efficiency of the base media 102 when the filter device 108 is deployed, e.g., in gas condition systems for a power generating system.

Figure 3:
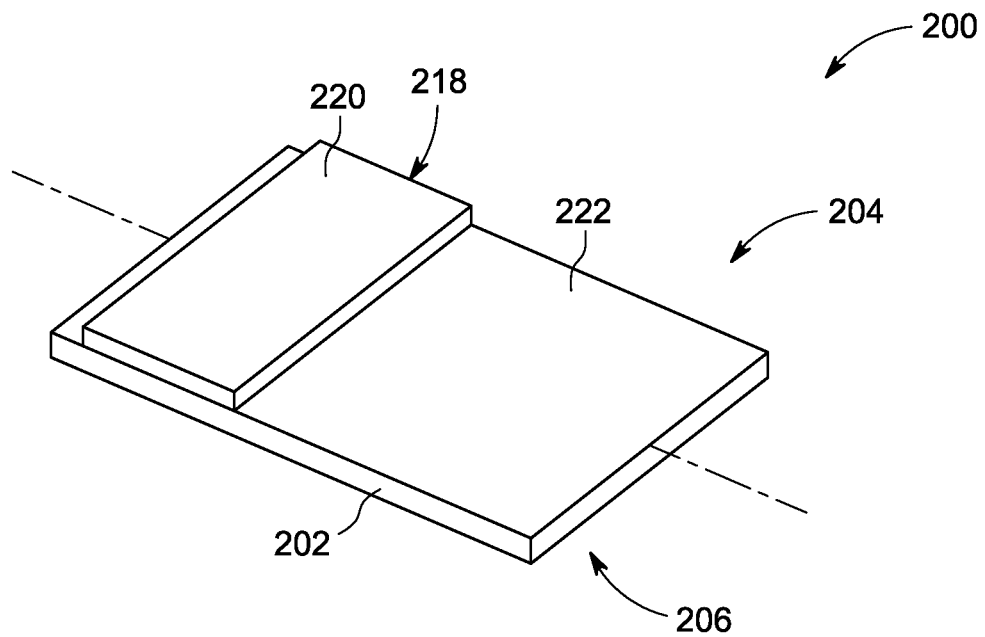
FIG. 3 depicts a perspective view of an exemplary embodiment of a filter media with a membrane covering a first side of a base media.
Figure 4:
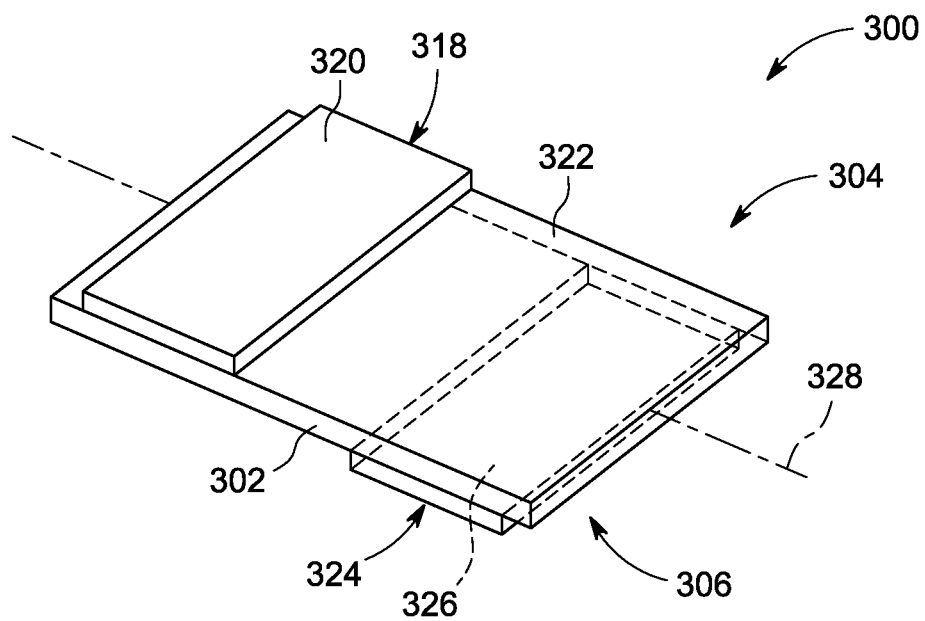
FIG. 4 depicts a perspective view of an exemplary embodiment of a filter media with a membrane covering a first side and a second side of a base media.

FIGS. 3 and 4 illustrate examples of a filter media 200 (FIG. 3) and a filter media 300 (FIG. 4) that maintain filter efficiency, while also passing certain testing criteria for pulse-jet cleaning and fog conditions. In FIG. 3, the filter media 200 includes a base media 202 with a first side 204 and a second side 206. A first membrane 218 is disposed on the first side 204. The first membrane 218 covers a first membrane area 220 of the first side 204. The filter media 200 also includes a non-laminated region 222.

In FIG. 3, the first membrane area 220 covers less than the total area of the first side 204. In one example, the first membrane area 220 covers 90% or less of the total area of the first side 204. In another example, the first membrane area 220 covers from about 10% to about 90% of the total area of the first side 204 and, in particular, may cover at least 50% or more of the total area of the first side 204. Varying the extent of coverage of the first membrane area 220 can change the performance of the filter media. This disclosure contemplates any number of coverage examples, which can be fine tuned to develop filter media with appropriate performance characteristics under specific conditions.

As best shown in FIG. 4, in addition to a first membrane 318 that covers a first membrane area 320 on the first side 304, the filter media 300 also has a second membrane 324, which covers a second membrane area 326 of the second side 306. In one example, the second membrane area 326 is offset from the first membrane area 320 along a longitudinal axis 328 to form the non-laminated region 322. In the example of FIG. 4, the first membrane 320 and the second membrane area 326 cover less than the total area of, respectively, the first side 304 and the second side 306. In one example, the first membrane area 318 and the second membrane area 326 cover 90% or less of the total area of, respectively, the first side 304 and the second side 306. In another example, the first membrane area 318 and the second membrane area 326 cover from about 10% to about 90% of the total area of, respectively, the first side 204 and the second side 306 and, in particular, the first membrane area 320 may covers at least 40% or more of the first aide 304 and the second membrane 324 may cover at least 40% or more of the second side 306. Varying the extent of coverage for one or both of the first membrane 320 and the second membrane 324 can change the performance of the filter media. This disclosure contemplates any number of coverage examples, which can be fine tuned to develop filter media with appropriate performance characteristics under specific conditions.

As shown in FIGS. 3 and 4, membrane material is absent on the first side 204, 304 and the second side 206, 306 in examples of the non-laminated regions 222, 322. The absence of membrane material exposes the surfaces of the base media 302 directly to air flow, e.g., incoming airstream F and pulse jet P. Such exposure can cause the filter media 200, 300 to exhibit performance characteristics in the non-laminated regions 222, 322 that are different from performance characteristics in the laminated regions (e.g., the first membrane area 318 and the second membrane area 326). These performance characteristics may prove advantageous during pulse jet cleaning and when the filter media 300 is exposed to fog and/or high moisture conditions.

This disclosure further contemplates configurations of the first membrane 320 and the second membrane 324 in which the non-laminated region is configured so that fluid traveling through the filter media will pass though at least one of the first membrane and the second membrane. For example, the edge of first membrane 320 and the edge of the second membrane 326 may align with one another so that the non-laminated region is effectively eliminated. Moreover, in other examples the first membrane 320 and the second membrane 326 may overlap, i.e., so the edge of the first membrane 320 on the first side 304 overlaps with the edge of the second membrane 326 on the second side 306. The amount of overlap can vary in connection with, for example, the percent coverage of each of the first membrane 320 and the second membrane 324 on the base media 302.

Performance of the filter media can thus be modified in accordance with the combination and extent to which the filter media includes laminated regions and non-laminated regions. Examples of filter media that have membrane material on only the first side of the base media, e.g., filter media 200 in FIG. 3, may pass the threshold criteria for the pulse-jet testing and the fog condition testing but have a relatively lower filter efficiency than configurations of the filter media that have membrane material on both the first side and the second side, e.g., filter media 300 of FIG. 4. For example, filter media that have both the first membrane 318 and the second membrane 324, separated by the non-laminated region 322, can pass the 200 hour testing procedures for pulse jet cleaning, have good performance in fog conditions, and maintain effective filter efficiency.

Turning now to FIGS. 5 and 6, a side view (FIG. 5) and a top view (FIG. 6) of an example of a filter media 400 is shown. In FIG. 5, the filter media 400 includes a base media 402 with a first membrane 418 on the first side 404 and a second membrane 424 on the second side 406. On the first side 404, the first membrane 418 has a plurality of upstream membrane elements (e.g., a first upstream membrane element 430 and a second upstream membrane element 432). The second membrane 424 has a plurality of downstream membrane elements (e.g., a third downstream membrane element 434 and a fourth downstream membrane element 436). The upstream membrane elements 430, 432 on the first side 404 and the downstream membrane elements 434, 436 on the second side 406 are spaced apart from one another to form a plurality of non-laminated regions (e.g., a first non-laminated region 438, a second non-laminated region 440, and a third non-laminated region 442). As set forth above, examples of the filter media 400 with combinations of laminated regions (e.g, membrane elements 430, 432, 434, 436) and non-laminated regions (e.g., non-laminated regions 438, 440, 442) are often less susceptible to clogging that can occur during high moisture content (e.g., fog) conditions. These configurations of the filter media 400 also permit the pulse jet P to effectively penetrate the filter media 400 to remove particulates to extend the life of the filter media 400.

As best shown in FIG. 6, the membrane elements 430, 432, 436, 438 have a form factor that defines the shape of the membrane material that is deposited on the base media 402. In the present form, the shape comprises an elongated rectangular body 446 that extends perpendicular to a first edge 448 and a second edge 450 of the base media 402. This disclosure also contemplates configurations of one or more of the membrane elements 430, 432, 436, 438 that form an angle with the edges 448, 450 that is less than 90°. In this configuration, the membrane elements 430, 432, 436, 438 will have a non-horizontal and/or non-longitudinal orientation (i.e., forming an angle with longitudinal axis 328 of FIG. 4), but will provide the same amount of coverage of the base media 402 as contemplated herein.

The size and/or location of the upstream membrane elements 430, 432 and the downstream membrane elements 434, 436 can vary as between elements on the same side of the base media 402 as well as between those on different sides of the base media 402. This disclosure further contemplates that the combination of size, shape, thickness, orientation, and other factors related to the membrane elements can change the performance characteristics of the filter media 400. Moreover, examples of the form factor can take many shapes, e.g., square, circular, oblong, elliptical, and the like. These form factors can be arranged variously across the sides of the base media (e.g., in various angular, linear, and like orientations). Thus, although the filter media 400 utilizes the elongated rectangular body 446, this disclosure further contemplates configurations in which one or more of the upstream membrane elements and the downstream membrane elements have different form factors than the other upstream membrane elements and downstream membrane elements. For example, the filter media 400 can include a homogenous arrangement (e.g., all circular areas) for the various membrane elements 440, 432, 434, 436 or a heterogeneous arrangement (e.g., combinations of circular areas and square areas) for the various membrane elements 430, 432, 434, 436.

Exemplary construction for the base media (e.g., base media 102, 202, and media 302) can comprise fabrics with woven and non-woven fibers, e.g., synthetic fibers. These fibers can include polyester fibers, polyamide fibers, polyolefin fibers, thermoplastic polyurethane fibers, polyetherimide fibers, polyphenyl ether fibers, polyphenlenylene sulfide fibers, polysufone fibers, aramid fibers, and mixtures thereof. In one example, the fabric includes synthetic fibers and/or binding agents that undergo a dry-laid process, which heats the synthetic fibers with binding agents and forms and cools the fabric by rolling the material between profiled cylinders or "calendar rolls."

Materials for use as the membrane (e.g., first membrane 218, 318, 418 and second membrane 326, 426) can comprise polymers and/or polymer derivatives and compositions, as well as materials conducive to electro-blown spinning processes. These materials include thermoplastic polymers and thermosetting polymers. A non-exhaustive listing of polymers includes polyimides, polyamides (nylon), polyaramides, polybenzimidazoles, polyetherimides, polyacrylonitriles, polyethylene terephthalate, polypropylene, polyanilines, polyethylene oxides, polyethylene naphthalates, polybutylene terephthalate, styrene butadiene rubber, polystyrene, polyvinyl chloride, polyvinyl alcohol, polyvinylidene chloride, polyvinyl butylene and copolymer or derivative compounds thereof. When electro-spinning processes are used to deposit material for the membranes onto the base media, the spun solution can be prepared by selecting a solvent that dissolves the selected polymers. The spun solution can be mixed with additives, for example, plasticizers, ultraviolet ray stabilizers, crosslink agents, curing agents, reaction initiators, and the like. Although dissolving the polymers may not require any specific temperature ranges, heating may be needed for assisting the dissolution reaction.

FIG. 7 illustrates a schematic diagram of an exemplary filter device 500, which can be part of a fluid conditioning system to remove particulates from airstream F. The filter device 500 is part of an array 502, which can include any number of filter devices (e.g., the filter device 500). In its present implementation, the filter device 500 is found in a power generating system 504 with an air filter unit 506, a turbo-machine 508, and a generator 510. The air filter unit 506 has a housing 512 with an inlet 514 and an outlet 516. The housing 512 encloses a wall 518 (also "tubesheet 518") that is upstream of the turbo-machine 508. Examples of the tubesheet 518 can one or more metal sheets with features (e.g., holes, openings, apertures) to mount the filter device 500 and to permit airstream F to flow through the wall. In one example, as shown in FIG. 7 the filter device 500 mounts to the upstream side of the tubesheet 518 in substantial alignment with a corresponding aperture in the tubesheet 518.

The turbo-machine 508 can include a compressor 520, a combustor 522, and a turbine 524 (e.g., a gas or steam turbine). During operation, the compressor 520 draws air (e.g., fluid F) into the air filter unit 506. The air passes through the filter device 500 and the tubesheet 518 before the air enters the turbo-machine 508. The compressor 520 pressurizes the air, which is subsequently fed to the combustor 522 to mix the air with fuel and ignite the mixture to provide the driving force for the turbine 524.

The filter device 500 can have a two element filter set (e.g., a first filter element 526 and an second filter element 528). The first filter element 526 and the second filter element 528 can comprise filter media (e.g., filter media 100, 200, 300, and 400), which collect particulates and are compatible with pulse-jet cleaning and fog conditions. Examples of the first filter element 526 and the second filter element 528 can abut one another, as shown in FIG. 5, to form the elongated body (e.g., elongated body 110 of FIG. 2) of the filter device 500. These elements can be formed together, e.g., out of the same or uniform filter media (e.g., filter media 100, 200, 300, and 400). In other examples, the filter elements are separate elements that couple to on another using conventional fasteners (e.g., nuts, bolts, adhesives, etc.). In still other embodiments, the filter elements can overlap one another to embed one of the first filter element 526 and the second filter element 528 in the other. This configuration for the filter elements can shorten the overall length of the filter device 500.

The filter device 500 can also include a mounting element that provides an interface to mount and secure the filter device 500, e.g., to the tubesheet 518 of air filter unit 506. The mounting element couples with tubesheet 518 to support the filter device 500 in the mounted configuration (e.g., the proper mounted configuration of FIG. 5). Examples of the mounting element 506 can secure to one or both of the first filter element 526 and the second filter element 528. However, in one or more constructions, the mounting element has limited, if any, affect on the flow of air that passes through the filter device 500.

One or more of the elements of the mounting element can be formed monolithically, as a single integrated structure. In other alternatives, the elements can comprise separate pieces that are assembled together using know fasteners and techniques. Construction of the mounting element can use metals, plastics, composites, and other materials compatible, e.g., with the filter media. Generally, suitable materials having mechanical properties to support the weight of the filter device 500 in the mounted configuration and/or to reduce the extent to which the filter device 500 will sag due to particulate build-up.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A filter device, comprising:
   a base media;
   a plurality of first membranes covering a first membrane area on a first side of the base media, wherein the first membrane area is less than a total area of the first side on which the plurality of first membranes are disposed, and wherein the plurality of first membranes are discontinuous; and
   a plurality of second membranes covering a second membrane area on a second side of the base media, wherein the second membrane area is less than a total area of the second side on which the plurality of second membranes are disposed, and wherein the plurality of second membranes are discontinuous,
   wherein the base media, first membrane, second membrane are co-planar.

2. The filter device of claim 1, wherein the second membrane area covers 90% or less of the total area of the second side of the base media.

3. The filter device of claim 1, wherein the first membrane area covers 90% or less of the total area of the first side of the base media.

4. The filter device of claim 1, wherein the first membrane area covers 40% or more of the total area of the first side of the base media, and wherein the second membrane covers 40% or more of the total area of the second side of the base media.

5. The filter device of claim 1, further comprising a non-laminated region, wherein the non-laminated region comprises an area on the first side and an area on the second side that are devoid of membrane material.

6. The filter device of claim 1, wherein each membrane of the plurality of first membranes has a first edge and each membrane of the plurality of second membranes has a second edge, and wherein the first edge overlaps with the second edge.

7. The filter device of claim 1, wherein each membrane of the plurality of first membranes and each membrane of the plurality of second membranes has an elongated rectangular body that extends from a first edge to a second edge of the base media.

8. The filter device of claim 7, wherein the elongated rectangular body is perpendicular to at least one edge of the base media.

9. The filter device of claim 7, wherein the elongated rectangular body forms an angle with at least one edge of the base media that is less than 90.degree.

10. The filter device of claim 1, wherein each membrane of the plurality of first membranes comprises a first material and each membrane of the plurality of second membranes comprises a second material, and wherein the first material is different from the second material.

11. A fluid conditioning system, comprising: an air filter unit comprising a tubesheet and a filter device secured to the tubesheet, the filter device comprising:
    a filter media with a base media;
    a first membrane covering a first membrane area of a first side of the base media, wherein the first membrane area is less than a total area of the first side on which the membrane is disposed; and
    a second membrane covering a second membrane area on a second side of the base media, wherein the second membrane area is less than a total area of the second side on which the second membrane is disposed,
wherein the base media, first membrane, second membrane are co-planar.

12. The fluid conditioning system of claim 11, wherein the filter media comprises a non-laminated region that comprises an area on the first side and an area on the second side that are devoid of membrane material.

13. The fluid conditioning system of claim 11, wherein the first membrane area covers from 10% to 90% of the total area of first side of the base media, and wherein the second membrane area covers from about 10% to 90% of the total area of the second side of the base media.

* * * * *